A. REICH.
PACKING RING.
APPLICATION FILED AUG. 1, 1914.
1,179,562.
Patented Apr. 18, 1916.
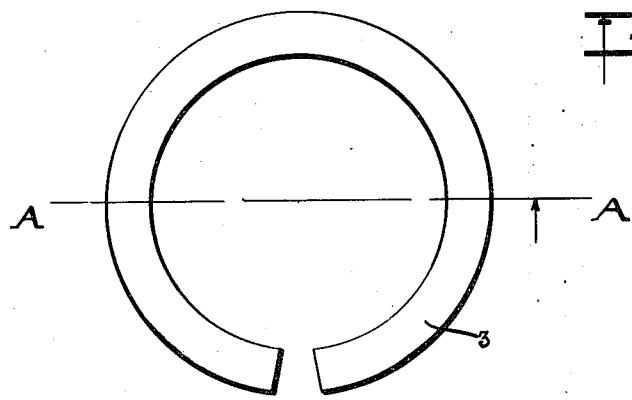
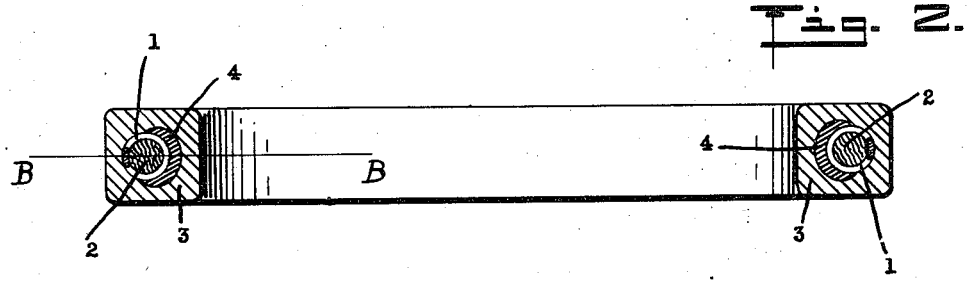
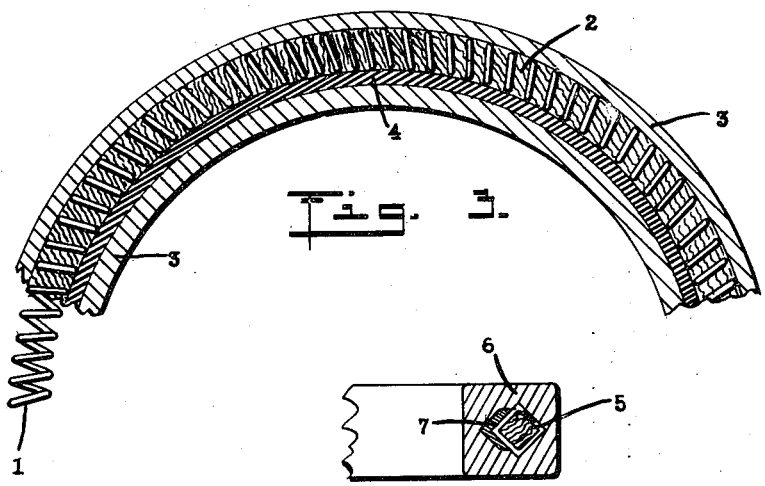
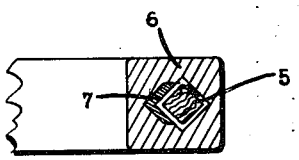
WITNESSES:
Howard P. King
Janet A. Ayers
INVENTOR:
Alois Reich
BY Russell M. Everett
ATTORNEY.

UNITED STATES PATENT OFFICE.

ALOIS REICH, OF NEWARK, NEW JERSEY.

PACKING-RING.

1,179,562.  Specification of Letters Patent.  Patented Apr. 18, 1916.

Application filed August 1, 1914. Serial No. 854,449.

*To all whom it may concern:*

Be it known that I, ALOIS REICH, a citizen of the United States, and a resident of Newark, in the county of Essex and State of New Jersey, have invented certain Improvements in Packing-Rings, of which the following is a specification.

This invention relates more particularly to that class of packing rings which are used for securing tight joints, such as in a stuffing box around a piston rod, and has for its objects to provide an improved packing ring of this nature; to increase the durability of the ring; to maintain the ring elastic for a long period without danger of scoring the piston rod; to secure simplicity of construction and economy of manufacture, and to obtain other advantages and results as may be brought out in the following description.

Referring to the accompanying drawings, in which like numerals of reference indicate the same parts throughout the several views, Figure 1 is a plan view of a packing ring embodying my invention; Fig. 2 is a cross sectional view of the same at line A—A upon a larger scale; Fig. 3 is a sectional view on line B—B of Fig. 2, and Fig. 4 is a cross sectional view similar to Fig. 2 showing a modified construction.

In the specific embodiment of the invention illustrated in said drawings, the reference numeral 1 indicates an annular core, the same preferably being a spiral spring of suitable diameter, material and strength for the purpose, filled by some compressible material 2 as wicking or cord which will prevent undue circulation of fluid therethrough. Said spring is inclosed or wrapped within a suitable covering 3, preferably pressed or otherwise shaped rectangular in cross section as shown. When placed in a stuffing box, the packing ring thus made can be compressed transversely at any portion of itself, the spring offering the necessary diametric resistance and the flexibility of the covering accommodating the ring to the change in shape. Obviously, in use the greatest wear will occur upon the inner annular surface of the ring and it is desirable to overcome the possibility of the hard core or spring coming in contact with and scoring the piston rod when the covering 3 becomes worn. For this purpose I insert within the covering, against the spring upon its inner annular side, a protective guard 4 of a suitable material, such as lead or babbitt, which will readily bend and give under pressure so that the ring will imperviously engage the piston rod, said material being sufficiently resistive to abrasion to prevent the core coming in contact with the piston rod. I have found that a guard crescent-shape in cross section gives very good results and does not counteract the resiliency of the spring core, but does protect the same from the piston rod when the protective covering is worn away. However, I do not wish to be understood as limiting myself to any particular cross-sectional shapes, since the core may be made of any shape desired and the bushing changed accordingly. For instance a square or rectangular spring 5 may be used with its corners pointed between the corners of the inclosing covering 6, as shown in Fig. 4. In this case I have shown a bushing 7 extending along the two sides of the spring which meet toward the center of the ring. Obviously other shapes could be employed without departing from the spirit or scope of the invention and I do not restrict myself to any of the details of construction except as more particularly pointed out in the appended claim when construed in the light of the prior art.

Having thus described the invention what I claim is,—

A packing comprising a central helical spring, a strip of non-abrasive metal at one side of said spring and fitted thereagainst in transverse direction so as to resist displacement therefrom, said strip adapted to take the wear off the convolutions of the spring at its inner side and presenting a smooth, continuous, outer surface, and a tubular covering of textile packing material enveloping the said spring and strip and holding them in position with respect to each other, said tubular covering adapted to receive the normal outside wear on the ring and being protected by the strip against abnormal inside wear against the spring.

ALOIS REICH.

Witnesses:
 HOWARD P. KING,
 JANET A. AYERS.